Figure 1:
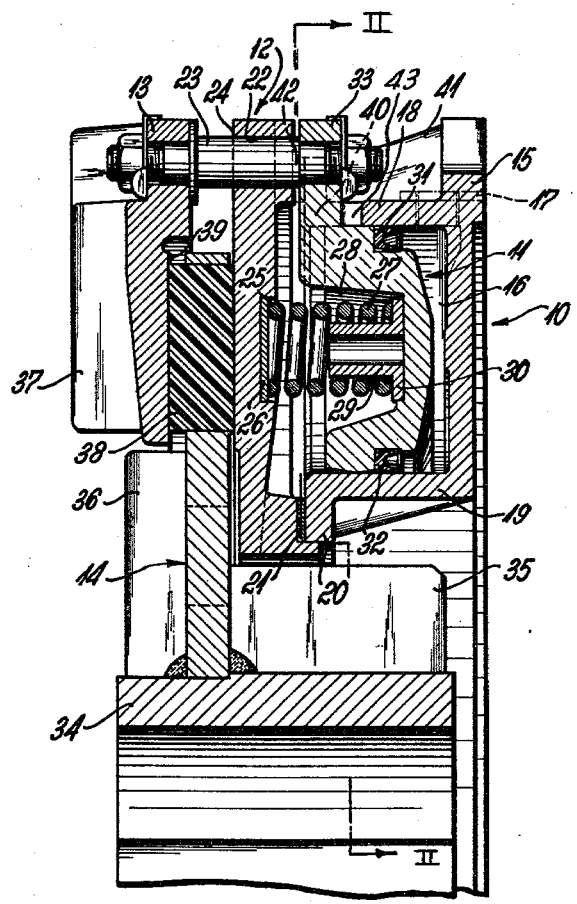

INVENTORS
Robert Herr
Otto Ortlinghaus
Jürgen Lemp
Adolf Ortlinghaus JR.
by Michael S. Striker

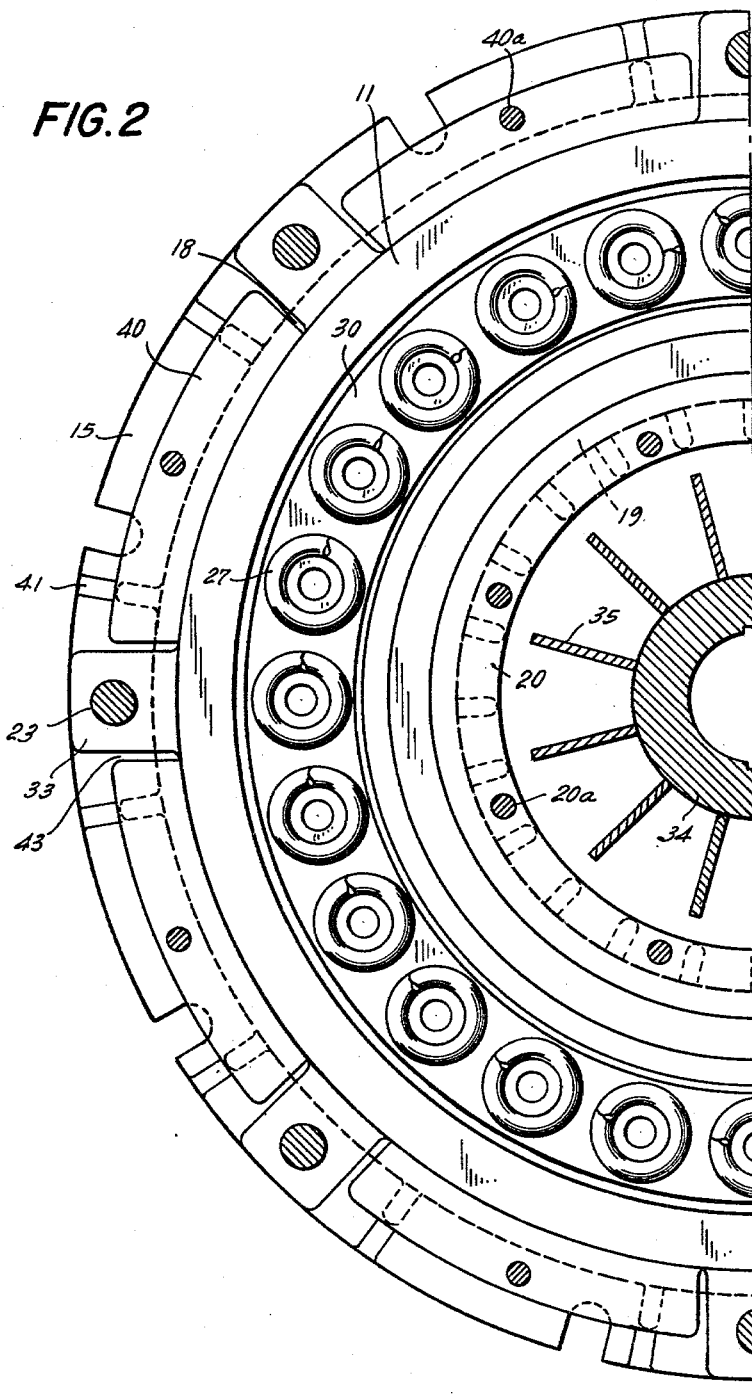

United States Patent Office 3,195,692
Patented July 20, 1965

3,195,692
FLUID PRESSURE RELEASED BRAKE
Robert Herr, Remscheid, Otto Ortlinghaus and Jürgen Lemp, Wermelskirchen, and Adolf Ortlinghaus, Remscheid, Germany, assignors to Gebr. Ortlinghaus, Wermelskirchen, Germany, a firm
Filed Dec. 24, 1963, Ser. No. 333,036
Claims priority, application Germany, Jan. 29, 1963, O 9,206
9 Claims. (Cl. 188—170)

This invention relates to a braking arrangement preferably for an intermittently driven machine shaft such as a press shaft, which can be switched on and off in alternation with a driving clutch associated with the shaft and is controlled by a working medium under pressure and in operative position brings to a standstill the shaft declutched from the drive and holds it in a predetermined angle of rotation. Such braking arrangements are subjected in some cases to very high thermal stresses so that their use in practice is generally dependent upon the quantities of heat which can be conducted off in a given unit of time. The known brakes of this type do not meet the requirements in a satisfactory manner especially when a compact construction is necessary.

The invention has for its object to produce a braking arrangement of the type above-described which comprises only a few parts which are easy to make and to arrange so as to save space and which, through effective heat transfer to the atmosphere, can be subjected to a heavy load and is reliable in operation.

To attain this object the present invention provides a braking arrangement which comprises in combination an annular cylinder fixed on the machine frame and having two annular walls, an open end and a closed end, an annular piston shiftable in said annular cylinder, an annular brake disc rigidly connected with at least one of the annular walls of the annular cylinder and arranged in front of the open end of said annular cylinder, apertures being distributed around the outer border zone of the annular brake disc, outward projections extending from the periphery of the annular piston and through open ended recesses in the outer annular wall, a pressure ring on the outer side of said annular brake disc, axially shiftable pins mounted at one end in said pressure ring and coupling said pressure ring with said outward projections, said pins extending through and being guided by the apertures distributed around the outer border zone of the annular brake disc, and a brake disc rigidly secured to the shaft and engaging between the annular brake disc fixed on the annular cylinder and the pressure ring fixed on the annular piston.

In this arrangement the annular cylinder performs a number of different functions. The annular cylinder guides the annular piston serving for controlling the brake, utilizing the pressure of a working medium for the purpose, and at the same time forms a base which can be bolted on the machine frame and carries the whole braking arrangement. Furthermore the annular cylinder is used as carrier for the annular brake disc which is stationary, that is, cannot displace in relation to the machine frame, and does not participate in the rotation of the shaft. Indirectly, that is through the intermediary of the above-mentioned annular brake disc rigidly fitted on the annular cylinder, this annular cylinder also guides the pressure ring shiftable parallel with the shaft as well as the annular piston movable in the annular cylinder. The two groups of parts shiftable in relation to each other parallel to the shaft, namely the annular cylinder with the annular brake disc rigidly fitted on it on the one hand and the annular piston with the pressure ring rigidly connected to it on the other hand, are at the same time telescoped and require but little space. Nevertheless the parts subjected to heat are to a great extent freely exposed to the surrounding air so that great quantities of heat can be conducted off.

Another important advantage of the arrangement proposed by the invention consists in that the inertia moment of the parts rotating with the shaft is extremely low because only the brake disc is rigidly connected to the shaft whereas the other parts do not participate in the movements of the shaft. This has a favourable effect not only on the efficiency of the brake but also on the efficiency of the driving clutch associated with the shaft.

In the interest of a simple construction of the brake it is also advisable to use the annular brake disc rigid with the cylinder as abutment for springs for the annular piston, which springs are pretensioned in the braking sense. This is easily possible because the annular brake ring is arranged in front of the open end of the annular cylinder. This produces a particularly simple and reliable operating construction.

The thermal stress determining the efficiency of the brake can be kept particularly low in that, according to another feature of the invention, the shaft or the hub of the annular brake disc, is provided with air circulating vanes in the regions of central passages leading to the annular cylinder, the annular brake disc fixed on the annular cylinder and the pressure ring fixed on the annular piston. These vanes assist the air ventilation and improve the passage of the heat from the brake members into the surrounding atmosphere.

The annular cylinder preferably has at its closed end an external flange serving for fixing to the machine frame and on the free edge of at least one but preferably both annular walls a flange serving as abutment for the annular brake disc.

A preferred embodiment of the invention will now be described by way of example and with reference to the accompanying drawings in which:

FIG. 1 is a fragmentary axial section through a braking arrangement according to the invention; and FIG. 2 is a fragmentary sectional view taken along line II—II of FIG. 1 and viewed in the direction of the arrows.

The drawing shows a brake which comprises an annular cylinder 10, an annular piston 11 shiftable therein, an annular brake disc 12, a pressure ring 13, and a brake disc 14 rigidly connected with the shaft of the machine. The annular cylinder 10 has at its closed end an external flange 15 which can be bolted to the frame of the machine, for example a press. In the working space 16 of the annular cylinder 10 a working medium such as compressed air or oil under pressure can be introduced through a connection 17. Devices for the control of the feed and discharge of the working medium are known and not shown in the drawing. The annular cylinder 10 has an outer annular wall 18 and an inner annular wall 19. The outer annular wall 18 has open ended recesses 43 extending from the free edge of the wall 18 partly into the same and distributed around the periphery thereof. The inner annular wall 19 is provided on its free edge with an inner flange 20 which serves as abutment for the already mentioned annular brake disc 12. A heat insulating insertion 21 is placed between the annular brake disc 12 and the inner flange 20. The annular brake disc 12 extends in front of the open end of the annular cylinder 10 and has apertures 22 distributed around its outer border zone each serving as a guide for an axially shiftable pin 23. The side 24 of the annular brake disc 12 remote from the annular cylinder 10 is substantially flat and constitutes a braking surface. The side of the annular brake disc 12 facing the annular cylinder 10 has an annular recess 25 in which a ring 26 is inserted against which pretensioned helical compression springs 27 bear with one of their ends and load the annular piston 11 slidable in the annular cylinder 10. This annular piston 11 is of U-shaped cross section and carries in annular recess 28 a ring 30 provided with guide projections 29 for the springs 27. The annular piston 11 is equipped with packings 31 and 32 in the regions where it cooperates with the annular walls 18 and 19. It has also outward projections 33 which extend as shown in FIGS. 1 and 2 through the open ended recesses 43 in the outer annular wall 18 of the cylinder. The already mentioned pins 23 are held at one end in the projections 33 by a screw thread or the like. At the recesses 43 the annular brake disc 12 is axially spaced from the outer annular wall and the depth of the recesses in the outer annular wall 18 of the annular cylinder 10, and the thickness of the projections 33 of the piston 11, are so chosen that the projections 33 can move parallel to the shaft a distance corresponding to the predetermined control stroke. The end portions of the pins 23 on the left of the drawing carry the pressure ring 13 also by means of a screw thread or the like. Through the coupling produced by the pins 23, the pressure ring 13 moves corresponding with the annular piston 11. Both the annular piston 11 and also the pressure ring 13 do not participate in the rotation of the shaft because the pins 23 connecting them are guided in the apertures 22 in the annular brake disc 12 which is rigidly connected for instance by screws 20a and 40a with the annular cylinder 10. The brake disc 14 which is welded on a hub 34 keyed on the shaft, not shown, engages between the facing surfaces of the annular brake disc 12 and the pressure ring 13. The hub 34 or the parts of the brake disc 14 in proximity thereto are provided with plates or the like serving as air circulating vanes 35 and 36. For increasing the radiation of heat the pressure ring 13 is also provided with ribs 37. The brake disc 14 is provided with apertures in its border zone which accommodate brake blocks 38 shiftable parallel to the shaft. The side 24 of the annular brake disc 12 cooperates with one side of the brake blocks 38 and the side 39 of the pressure ring 13 forming a braking surface, with the other side thereof. In the embodiment illustrated, the outer annular wall 18 of the cylinder 10 is also provided with a flange 40 for reliably supporting the annular brake disc 12, which flange is interrupted by the apertures accommodating the projections 33. Ribs 41 extend between the flange 40 and the flange 15. The annular brake disc 12 bears against the flange 40 through the intermediary of a heat insulating insertion 42.

The drawing shows the braking arrangement in operative or braking position. In this position the working space 16 of the piston-cylinder unit is relieved so that the springs 27, through the intermediary of the annular piston 11 and the pins 23, press the side 39 of the pressure ring 13 against the brake blocks 38. These brake blocks being shiftable in relation to the brake disc 14 bear on the other side of the brake disc 14 against the side 24 of the annular brake disc 12. As the parts move into the position shown, the rotating shaft will be brought to a standstill and then held in the position of rest through the intermediary of the brake disc 14. To disengage the brake, a working medium under pressure is introduced into the working space 16. This medium shifts the annular piston 11 against the pressure of the springs 27 and lifts the pressure ring 13 off the brake blocks 38 through the intermediary of the pins 23. The shaft can then be driven. To again apply the brake, it is then only necessary to relieve the annular piston 11 so that the springs 27 can again become operative.

As already mentioned, the construction illustrated is only a preferred embodiment of the invention. Many modifications are possible. The fundamental arrangement proposed by the invention might also be attained by providing several brake discs 14 and arranged side by side on the shaft, between which plates or the like not taking part in the rotation engage and are held by the pins 23. However, the off-flow of the heat, especially from the intermediate parts of the braking arrangement, would then be rendered more difficult.

We claim:

1. A braking arrangement for an intermittently driven machine shaft, comprising, in combination, support means; an annular cylinder fixedly mounted on said support means and having two annular walls, an open end, and a closed end; an annular brake disc rigidly connected with at least one of said annular walls of said annular cylinder, arranged in front of said open end thereof and being formed in an outer border zone thereof with a plurality of angularly spaced apertures, the outer one of said annular walls of said cylinder being at least in part axially spaced from said brake disc; an annular piston fluidtightly guided in said annular cylinder for movement in axial direction while being prevented from turning relative thereto, said piston defining with said closed end of said cylinder a working space, said piston having a plurality of projections projecting in radial outward direction through the space between said brake disc and said outer one of said annular walls of said cylinder beyond the latter; a pressure ring coaxial with said brake disc and located at and spaced from the side thereof facing away from said cylinder; a plurality of connecting means fixedly connecting said pressure ring and said projections for simultaneous movement in axial direction, said connecting means extending respectively through said apertures in said brake disc and being slidably guided therein; a second brake disc secured to said shaft for rotation therewith and engaged between said pressure ring and said annular brake disc; pretensioned springs engaging said annular piston and loading the same in a braking sense; and passage means communicating with said working space between said annular piston and said closed end of said cylinder for feeding pressure fluid into and out from said working space, so that the braking arrangement may be released by feeding pressure fluid into said working space.

2. A braking arrangement according to claim 1, wherein the annular brake disc is connected to both walls of the annular cylinder.

3. A braking arrangement according to claim 1, wherein the brake disc rigidly secured to the shaft is equipped with friction blocks shiftable parallel to the shaft.

4. A braking arrangement according to claim 1, wherein the annular brake disc fixed on the annular cylinder forms an abutment for pretensioned springs loading the annular piston in the braking sense.

5. A braking arrangement according to claim 1, wherein at least one heat-insulating insertion is introduced in the region of the joint between the annular brake disc fixed on the annular cylinder and the cylinder itself.

6. A braking arrangement according to claim 1, wherein air circulating vanes are mounted on the hub of the brake disc in the regions of central passages leading to the annular cylinder, the annular brake disc fixed on the annular cylinder and the pressure ring fixed on the annular piston.

7. A braking arrangement according to claim 1, wherein air circulating vanes are mounted on the shaft of the brake disc in the regions of central passages leading to the annular cylinder, the annular brake disc fixed on the annular cylinder and the pressure ring fixed on the annular piston.

8. A braking arrangement according to claim 1, wherein the outer one of said annular walls of the annular cylinder is formed with a plurality of open ended recesses and wherein the projections on the annular piston are shiftable in said open ended recesses.

9. A braking arrangement according to claim 1, wherein the annular cylinder has at its closed end an external flange serving for fixing on the machine frame and at least one of the annular walls of the cylinder has a flange serving as abutment for the annular brake disc.

References Cited by the Examiner

UNITED STATES PATENTS

| | | | |
|---|---|---|---|
| 2,089,733 | 8/37 | Griley | 188—170 X |
| 2,238,943 | 4/41 | McCune et al. | 188—264 X |
| 2,517,972 | 8/50 | Cardwell et al. | 188—264 X |
| 2,584,192 | 2/52 | Danly et al. | 188—170 |

FOREIGN PATENTS 1,148,663  6/57  France.

ARTHUR L. LA POINT, *Primary Examiner.*

DUANE A. REGER, *Examiner.*